United States Patent [19]

Hayashi

[11] Patent Number: 5,082,809

[45] Date of Patent: Jan. 21, 1992

[54] HIGH-STRENGTH ALUMINA SINTERED BODY AND PROCESS FOR PREPARATION THEREOF

[75] Inventor: Katsura Hayashi, Kokubu, Japan

[73] Assignee: Kyocera Corporation, Kyoto, Japan

[21] Appl. No.: 286,888

[22] Filed: Dec. 20, 1988

[30] Foreign Application Priority Data

Dec. 21, 1987 [JP] Japan .................. 324749
Dec. 23, 1987 [JP] Japan .................. 326535

[51] Int. Cl.$^5$ ............................................. C04B 35/48
[52] U.S. Cl. .................................... 501/105; 501/103; 501/153
[58] Field of Search ................ 501/105, 104, 103, 153

[56] References Cited

U.S. PATENT DOCUMENTS

| | | | |
|---|---|---|---|
| 3,247,000 | 4/1966 | Taylor | 501/105 |
| 4,656,145 | 4/1987 | Soroi | 501/103 |
| 4,829,028 | 5/1988 | Seki et al. | 501/105 |
| 4,849,142 | 7/1989 | Panda et al. | 264/65 |
| 4,880,757 | 11/1989 | Henslee et al. | 501/103 |

*Primary Examiner*—William R. Dixon, Jr.
*Assistant Examiner*—Sue Hollenbeck
*Attorney, Agent, or Firm*—Spensley Horn Jubas & Lubitz

[57] ABSTRACT

Disclosed is a high-strength alumina sintered body which consists of 1 to 30% by weight, based on $Al_2O_3$ and $ZrO_2$, of $ZrO_2$ and 99 to 70% by weight, based on $Al_2O_3$ and $ZrO_2$, of $Al_2O_3$, and unavoidable impurities, said sintered body having a peak based on $ZrO_2$ at a position of a wave body having a peak based on $ZrO_2$ at a position of a wave number of $600 \pm 10$ cm$^{-1}$ in a measurement chart of the laser Raman spectrum analysis. This sintered body has a high flexural strength and a high breaking toughness in combination.

8 Claims, 4 Drawing Sheets

(X 20.0K)

HIGH-STRENGTH ALUMINA SINTERED BODY AND PROCESS FOR PREPARATION THEREOF

BACKGROUND OF THE INVENTION (1) Field of the Invention

The present invention relates to a sintered body comprising alumina as the main component and zirconia, and a process for the preparation thereof. More particularly, the present invention relates to an improvement of a sintered body valuable as a cutting tool, a high-temperature material, an ordinary industrial machine material or a living body material.

(2) Description of the Related Art

A tool composed of a ceramic material is advantageous in that the tool is excellent in the hardness, abrasion resistance and heat resistance, but the tool is defective in that chipping or flawing is easily caused and therefore, use or finish processing is restricted. With recent development of machine tools, the necessity to enhance the machining speed and prolong the cycle time for exchange of tools increases, and ceramic tools having a high stability and a high strength, which are capable of meeting this requirement, are desired.

Alumina ($Al_2O_3$) is low in the reactivity with metals and is excellent in the abrasion resistance, and therefore, alumina attracts attention as the material valuable for machining tools. However, alumina involves a problem of a low breaking toughness ($K_{1C}$). Zirconia ($ZrO_2$) has a high flexural strength and a high breaking toughness, but at 200° to 300° C., the strength abruptly decreases and zirconia is thermally unstable. Moreover, zirconia reacts violently with iron and a machining tool formed of zirconia cannot be practically used.

Accordingly, there has been adopted a method in which the breaking toughness of $Al_2O_3$ is improved by incorporating and dispersing $ZrO_2$ in $Al_2O_3$. Two types of this improving method have been proposed. According to one proposal, monoclinic $ZrO_2$ is dispersed in an $Al_2O_3$ sintered body and micro-cracks are formed by the phase transition of $ZrO_2$. According to the other proposal, a tetragonal crystal is dispersed in an $Al_2O_3$ sintered body and the energy on the top end of the crack is absorbed by the phase transition of $ZrO_2$.

In the above-mentioned $Al_2O_3$-$ZrO_2$ type sintered body, it is known that the particle size of $ZrO_2$ has influences on the breaking toughness and flexural strength of the sintered body. More specifically, if the particle size of dispersed $ZrO_2$ is smaller than 1 $\mu m$, the above-mentioned toughness-improving effect tends to decrease. The reason is that expansion of the volume of $ZrO_2$ particles is inhibited by $Al_2O_3$ particles and the phase transition of from the tetragonal crystal to the monoclinic crystal is hardly caused. On the other hand, from the viewpoint of the flexural strength, it is preferred that $ZrO_2$ be present in the form of fine particles, and if the large $ZrO_2$ particles having a size of 2 to 3 $\mu m$ are present, these particles act as the breaking source.

As is apparent from the foregoing description, in the conventional $Al_2O_3$-$ZrO_2$ type sintered body, the breaking toughness and the flexural strength are not compatible with each other. Therefore, the conventional technique is defective in that a sintered body which is excellent in both of the breaking toughness and the flexural strength cannot be obtained.

More specifically, according to the former method, the breaking toughness is improved, but the flexural strength is low and the sintered body is not practically used. According to the latter method, though the effect of improving the breaking toughness is relatively lower than the effect attained according to the former method, the flexural strength is highly improved because of absorption of the energy on the top end of the crack or by the compressive stress generated by processing of the surface. However, in order to make $ZrO_2$ present in the form of a tetragonal crystal in $Al_2O_3$, it is necessary to disperse $ZrO_2$ in the form of fine particles having a size of 0.3 to 0.5 $\mu m$ or a smaller size.

Since it is technically very difficult to control the particle size of $ZrO_2$ to less than 0.5 $\mu m$ in the sintered body, there has generally been adopted a method in which a small amount of a stabilizer such as MgO, CaO or $Y_2O_3$ is added so that metastable tetragonal $ZrO_2$ is formed even if the particle size of $ZrO_2$ particles is about 1 $\mu m$.

This method is insufficient in that because of non-uniform dispersion of the additive, some particles are excessively stabilized and do not participate in absorption of the energy on the top end of the crack, but metastabilization of tetragonal crystals cannot be attained without addition of the additive, and it is substantially impossible to metastabilize cubic crystals without addition of the additive.

SUMMARY OF THE INVENTION

It is therefore a primary object of the present invention to provide an $Al_2O_3$-$ZrO_2$ sintered body in which the above-mentioned defects of the conventional $Al_2O_3$-$ZrO_2$ sintered bodies are overcome and which is excellent in both of the flexural strength and the breaking toughness, and a process for the preparation of this sintered body.

Another object of the present invention is to provide an $Al_2O_3$-$ZrO_2$ sintered body consisting substantially solely of $Al_2O_3$ and $ZrO_2$ and being free of a stabilizer, in which cubic $ZrO_2$ or orthorhombic $ZrO_2$ are present, and a process for the preparation of this sintered body.

Still another object of the present invention is to provide a process for the preparation of an $Al_2O_3$-$ZrO_2$ sintered body, in which firing of a molded body of a mixture of $Al_2O_3$ and $ZrO_2$ is carried out at a temperature lower than the temperatures adopted in the conventional methods.

We found that in preparing an $Al_2O_3$-$ZrO_2$ sintered body by mixing $Al_2O_3$ powder with $ZrO_2$ powder, molding the mixture and firing the molded body, if at least $Al_2O_3$ is activated by dry pulverization before or after the above-mentioned mixing, the molded body can be fired at a relatively low temperature lower than 1500° C., and that in the so-prepared $Al_2O_3$-$ZrO_2$ sintered body, $ZrO_2$ is metastabilized in the form of cubic $ZrO_2$ or orthorhombic $ZrO_2$ known as the super-high pressure phase of $ZrO_2$ in the alumina crystal and this sintered body has an excellent flexural strength and an excellent breaking toughness in combination. We have now completed embodiments of the present invention based on these finding.

In accordance with one embodiment of the present invention, there is provided a high-strength alumina sintered body which consists of 1 to 30% by weight, based on $Al_2O_3$ and $ZrO_2$, of $ZrO_2$ and 99 to 70% by weight, based on $Al_2O_3$ and $ZrO_2$, of $Al_2O_3$, and unavoidable impurities, said sintered body having a peak based on $ZrO_2$ at a position of a wave number of 600±10 $cm^{-1}$ in a measurement chart of the laser Raman spectrum analysis. In a preferred embodiment of the sintered body of the present invention, the sintered body has a polycrystalline structure in which zirconia is present in the form of particles having an average particle size smaller than 0.5 μm and alumina is present in the form of particles having an average particle size smaller than 1.3 μm, and an intergranular mutual stress is present in the polycrystalline structure.

In accordance with another embodiment of the present invention, there is provided a process for the preparation of a high-strength alumina sintered body, which comprises mixing 1 to 30% by weight of zirconia powder with 99 to 70% by weight of alumina powder, activating at least the alumina powder by subjecting at least the alumina powder to dry pulverization before or after said mixing step, molding the mixture containing the activated alumina powder to a predetermined molded body, and firing the molded body at a temperature lower than 1500° C. to form a sintered body. In a preferred embodiment of the preparation process of the present invention, alumina powder having a BET specific surface area of at least 5 m$^2$/g and zirconia powder having a BET specific surface area of at least 5 m$^2$/g are used, and after the firing step, the sintered body is cooled at a cooling rate of 3° to 100° C./min.

DETAILED DESCRIPTION OF THE PREFERRED EMBODIMENTS

In the conventional Al$_2$O$_3$-ZrO$_2$ sintered body, the improvement of the flexural strength is not compatible with the improvement of the toughness. Decrease of the particle size of ZrO$_2$ (below 0.5 μm) in the sintered body is effective for improving the flexural strength. However, in this case, a part of ZrO$_2$ is excessively stabilized and the proportion of metastable ZrO$_2$ participating in absorption of the energy decreases, and therefore, the breaking energy is not absorbed and the toughness is degraded. On the other hand, if the particle size of ZrO$_2$ particles is about 0.5 to about 1.0 μm, the transition of from tetragonal ZrO$_2$ to monoclinic ZrO$_2$ is expedited and the toughness is improved, but the microcracks formed with the transition or the ZrO$_2$ particles per se act as the breaking source and the flexural strength is degraded.

In contrast, according to the present invention, both of the flexural strength and the breaking toughness are simultaneously improved. The basic composition of the sintered body of an embodiment of the present invention comprises 1 to 30% by weight, especially 15 to 20% by weight, of ZrO$_2$, with the balance comprising Al$_2$O$_3$ and unavoidable impurities. If the amount of ZrO$_2$ is smaller than 1% by weight, the effect of improving the toughness is insufficient, and if the amount of ZrO$_2$ is larger than 30% by weight, the proportion of an embodiment of the monoclinic crystal (m-ZrO$_2$) in the crystal phase of ZrO$_2$ in the sintered body increases and ZrO$_2$ participating in absorption of the energy is substantially reduced, with the result that the flexural strength and toughness are degraded.

It is preferred that the amounts of unavoidable impurities such as SiO$_2$, Fe$_2$O$_3$ and TiO$_2$ be as small as possible, but no particular trouble arises if the entire amount of the impurities is smaller than 3% by weight based on the total amount of the sintered body.

Figure 1:
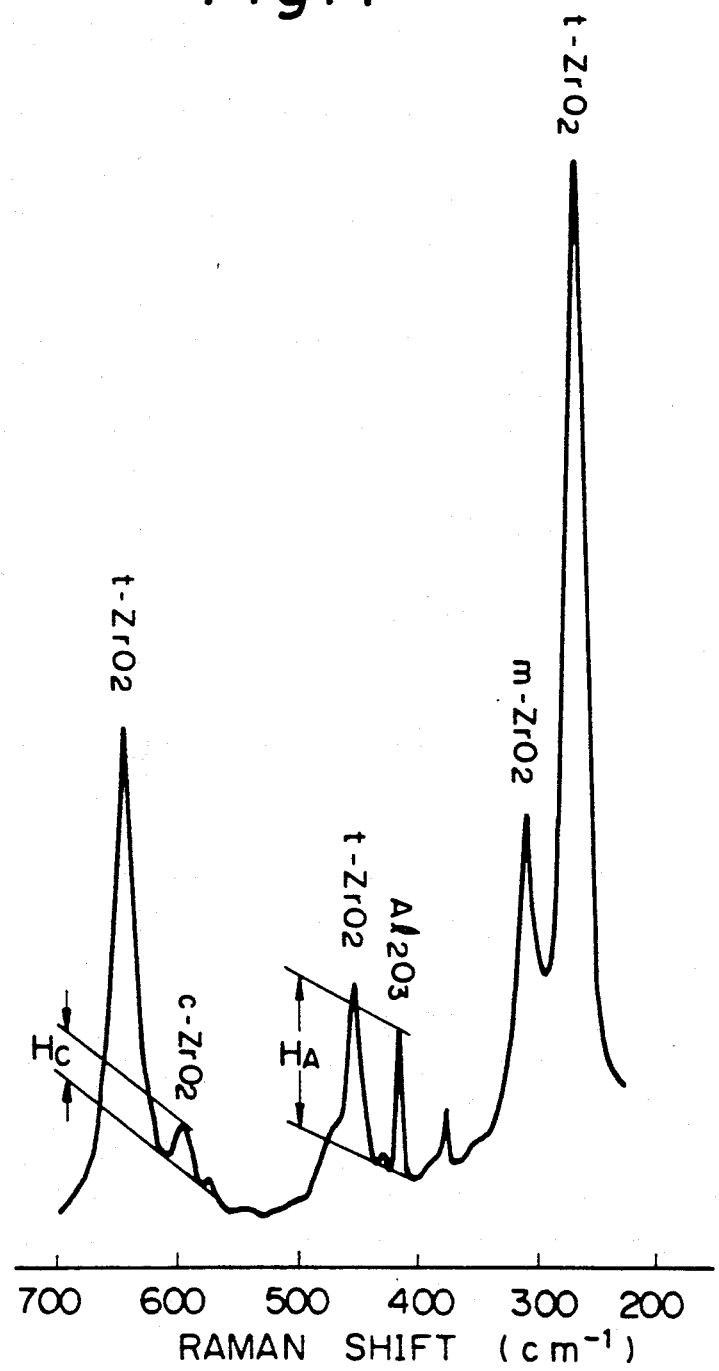
FIG. 1 shows a chart obtained by the laser Raman spectrum of a product according to an embodiment of the present invention (sample No. 5 in Example 1).
Figure 2:
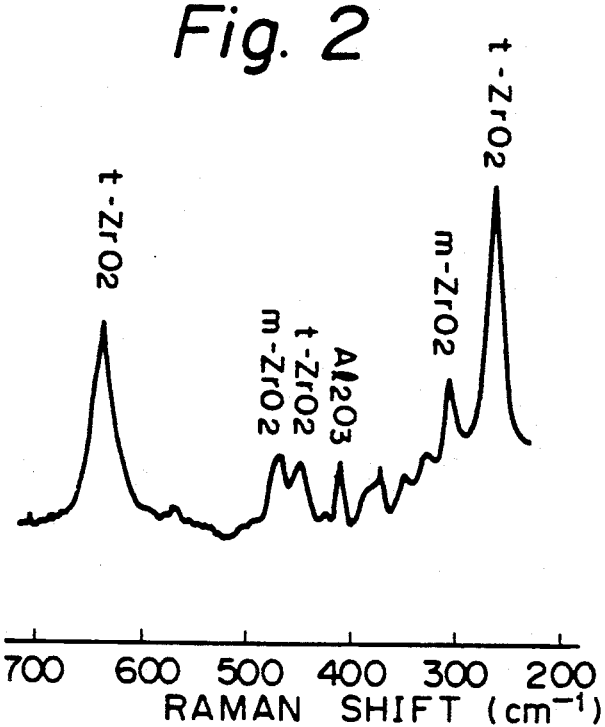
FIG. 2 shows a chart obtained by the laser Raman spectrum analysis of the comparative product (sample No. 10 in Example 1).

The characteristic features of the alumina sintered body of the present invention will now be described with reference to FIGS. 1 and 2 showing charts obtained by the laser Raman analysis. When the chart of FIG. 1 is compared with the chart of FIG. 2, it will readily be understood that a peak is present in the vicinity of 600 cm$^{-1}$ in the chart of FIG. 1. This peak will now be examined. In monoclinic ZrO$_2$ (m-ZrO$_2$), main peaks generally appear at 480 cm$^{-1}$, 180 cm$^{-1}$ and 630 cm$^{-1}$, and in tetragonal ZrO$_2$ (t-ZrO$_2$), main peaks generally appear at 270 cm$^{-1}$ and 640 cm$^{-1}$. On the other hand, cubic ZrO$_2$ (c-ZrO$_2$) or orthorhombic ZrO$_2$ (o-ZrO$_2$) has the main peak in the vicinity of 610 to 600 cm$^{-1}$. Accordingly, it is judged that this peak at 600 cm$^{-1}$ indicates cubic ZrO$_2$ or orthorhombic ZrO$_2$.

As is apparent from the examples given hereinafter, as the ratio of the height Hc of the peak of c-ZrO$_2$ in the vicinity of 600 cm$^{-1}$ to the height Ha of the peak of Al$_2$O$_3$ in the vicinity of 415 cm$^{-1}$, that is, the ratio Hc/Ha, is higher, the properties of the sintered body are more improved. Namely, if the peak height ratio defined by (Hc/Ha)×100 is at least 10%, especially at least 20%, a satisfactory combination of the flexural strength and breaking toughness can be obtained.

Figure 3:
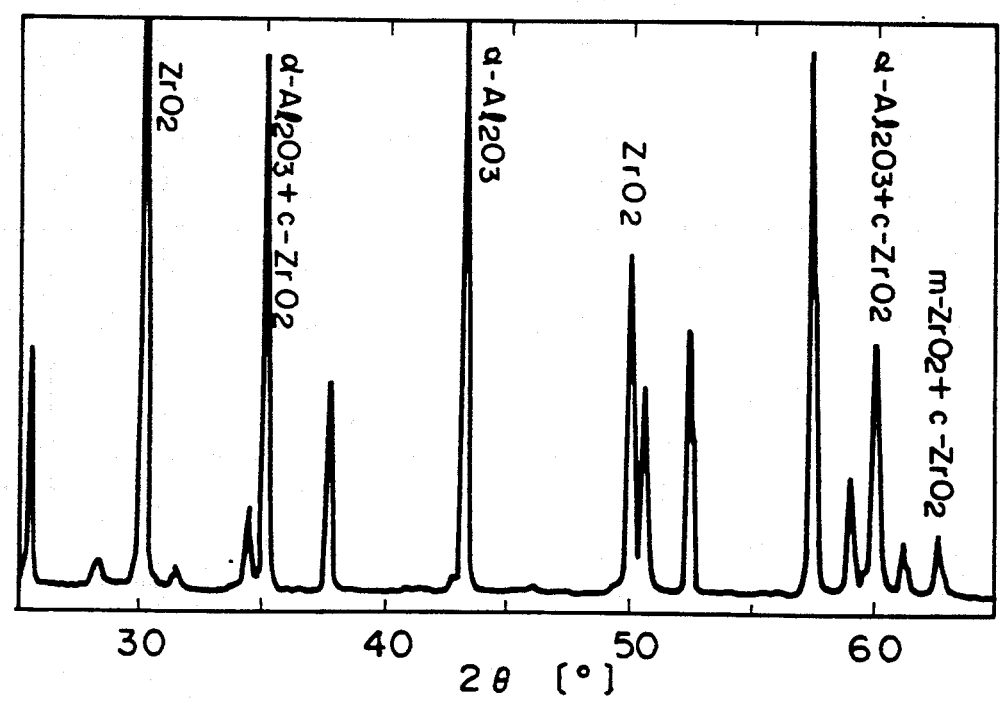
FIG. 3 shows an X-ray diffraction chart of a product according to an embodiment of the present invention (sample No. 5 in Example 1).
Figure 4:
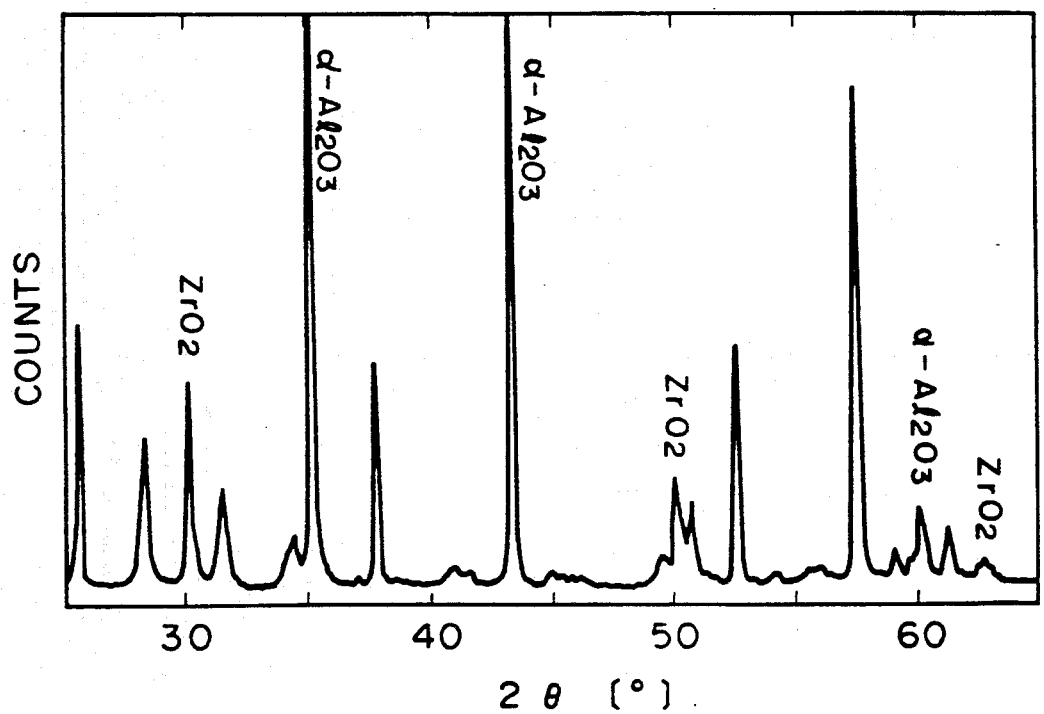
FIG. 4 shows an X-ray diffraction chart of the comparative product (sample No. 9 in Example 1).

FIG. 3 shows an X-ray diffraction curve of the sintered body of the present invention and FIG. 4 shows an X-ray diffraction curve of an embodiment of the comparative sintered body.

This X-ray diffraction curve of ZrO$_2$ has been examined from old. For example, Lewis et al. published the X-ray diffraction curve of monoclinic ZrO$_2$ (ANP Dept., CINCINATTI, 15, OHIO), Smith et al. published the X-ray diffraction curve of tetragonal ZrO$_2$ (Annual Report to the Joint Committee on Powder Diffraction Standard, 1973), and Katz published the X-ray diffraction curve of cubic ZrO$_2$ (J. Am. Ceram. Soc., 54, 531, 1971).

In the X-ray diffraction curve by Cu-K rays, the (101) plane of tetragonal ZrO$_2$ (t-ZrO$_2$) generally has a peak at 2θ=29.8° and the crystal plane spacing is 2.995 Å, while the (111) plane of cubic ZrO$_2$ (c-ZrO$_2$) has a peak at 2θ=30.5° and the crystal plane spacing is 2.93 Å. In contrast, in the sintered body of the present invention, ZrO$_2$ has a peak at the position where 2θ is larger than 29.8°, and the crystal plane spacing is larger than 2.93 Å and smaller than 2.995 Å. In addition to the peak at 2θ=30.5°, c-ZrO$_2$ has peaks at 2θ=35.1°, 50.6°, 60.3° and 63.1°. Of these peaks, the peak at 2θ=35.1° overlaps the peak of α-alumina, and the peak at 2θ=50.6° overlaps the monoclinic ZrO$_2$ (m-ZrO$_2$) or tetragonal ZrO$_2$ (t-ZrO$_2$). Furthermore, the peak at 2θ=60.3° overlaps the peak of α-Al$_2$O$_3$ and the peak at 2θ=63.1° overlaps the peak of m-ZrO$_2$.

If heights of the peak between 59.5° and 61° and the peak between 62.0° and 63.5° are designated as H60 and H63, respectively, supposing that c-ZrO$_2$ is not present, the ratio H60/H43 of H60 to the height (H43) of the main peak of α-Al$_2$O$_3$ is constant and 0.07 because H60 is the height of only the peak of α-Al$_2$O$_3$. Similarly, the ratio H63/H28 of H63 to the height of the main peak of m-ZrO$_2$ is constant and 0.1 because H63 is the height of only the peak of m-ZrO$_2$.

However, as is apparent from the examples given hereinafter, in the sintered body of the present invention, the ratio H63/H28 is larger than 0.1 and the ratio H60/H43 is larger than 0.07. It is preferred that the ratio H63/H28 be in the range of from 1.00 to 2.30 and the ratio H60/H43 be in the range of from 0.20 to 0.40.

In view of the foregoing, it is considered that in the sintered body of the present invention, c-ZrO$_2$ or o-ZrO$_2$ is present.

If c-ZrO$_2$ or o-ZrO$_2$ is thus present in Al$_2$O$_3$, the breaking toughness is improved because the energy of an external stress is absorbed in two stages of c-ZrO$_2$ (o-ZrO$_2$)→t-ZrO$_2$→m-ZrO$_2$. Furthermore, since the volume change at the phase transition of c-ZrO$_2$ (o-ZrO$_2$)→t-ZrO$_2$→m-ZrO$_2$ is larger than the volume change at the phase transition of t-ZrO$_2$→m-ZrO$_2$, the residual compressive stress on the surface after processing is increased, whereby the flexural strength is improved.

Incidentally, in the sintered body of an embodiment of the present invention, Al$_2$O$_3$ is present in the form of crystalline particles having a particle size of 0.3 to 1.3 μm, and it is preferred that ZrO$_2$ be present in the form of crystalline particles having a particle size of 0.1 to 1.5 μm, especially 0.1 to 0.5 μm. If the particle size of ZrO$_2$ particles exceeds 1.5 μm, the crack formed by the phase transition acts as the breaking source causing reduction of the flexural strength.

The majority of the crystal phase of ZrO$_2$ is preferably occupied by c-ZrO$_2$ or o-ZrO$_2$ and t-ZrO$_2$, and it is preferred that the proportion of monoclinic ZrO$_2$ be less than 50%, especially less than 20%, of entire ZrO$_2$. If the proportion of m-ZrO$_2$ exceeds 50%, the toughness is degraded.

A preferred alumina sintered body of the present invention is characterized in that the sintered body has a high-density polycrystalline structure comprising 1 to 30% by weight of zirconia particles having an average particle size smaller than 0.5 μm, with the balance consisting essentially of alumina particles having an average particle size smaller than 1.3 μm, and an intergranular mutual stress is present in the polycrystalline structure.

This intergranular mutual stress is very effective for making ZrO$_2$ particles present in the form of tetragonal ZrO$_2$ and/or cubic or orthorhombic ZrO$_2$ in the structure, and Al$_2$O$_3$ particles tighten ZrO$_2$ particles to inhibit the transition of ZrO$_2$, whereby ZrO$_2$ can be stably made present in the form of tetragonal ZrO$_2$ and/or cubic or orthorhombic ZrO$_2$ in the sintered body.

Figure 5:
FIG. 5 is an electron microscope photograph showing the surface of the an alumina sintered body according to an embodiment of the present invention (sample No. 4 in Example 2) after the heat treatment.

This mutual stress promotes branching of the crack during the course of advance of breaking and exerts an effect of dispersing the breaking energy. If the mutual stress is small, this effect is insufficient, and if the mutual stress is excessive, internal breaking is caused by the mutual stress and the strength of the sintered body is reduced. Accordingly, it is necessary to realize an appropriate mutual stress. The degree of this mutual stress can be judged by subjecting the sintered body to a heat treatment at 1200° to 1600° C. More specifically, if alumina particles are softened by the heat treatment at 1200° to 1600° C., not only the transition of ZrO$_2$ but also the expansion of the volume is caused, resulting in deformation of Al$_2$O$_3$ particles. This deformation is especially prominently observed in Al$_2$O$_3$ particles on the polished surface of the sintered body. For example, a wavy pattern as shown in the microscope photograph of FIG. 5 is formed. This deformation is observed in all or some of Al$_2$O$_3$ particles in the sintered body. If the mutual stress is too small, this deformation is not caused, and if the mutual stress is excessive, alumina particles are broken before the deformation and any deformation is not observed at all.

If an intergranular mutual stress is thus present in Al$_2$O$_3$ particles and ZrO$_2$ particles, the resistance to a breaking force applied from the outside is increased, with the result that the flexural strength and breaking toughness are prominently improved.

In preparing a sintered body according to an embodiment of the present invention, at least Al$_2$O$_3$ powder is activated by dry pulverization before or after the step of mixing Al$_2$O$_3$ powder with ZrO$_2$ powder. This dry pulverization is different from ordinary ball mill pulverization, and by this dry pulverization, a strain is generated in crystals of Al$_2$O$_3$ powder and sintering of the molded body at a low temperature, that is, a temperature lower than 1500° C., becomes possible.

The intended activating effect is hardly attained by customary wet pulverization using ball mills or the like, and therefore, means capable of high-speed pulverization is adopted. For example, a high-speed vibrating mill, an attrition mill or a jet mill is preferably adopted. This dry pulverization is carried out to such an extent that a strain is generated in Al$_2$O$_3$ crystals or in both of Al$_2$O$_3$ crystals and ZrO$_2$ crystals in the starting powder. In general, the dry pulverization is carried out for at least 30 minutes.

Of course, this dry pulverization may be carried out before or after the step of mixing Al$_2$O$_3$ powder with ZrO$_2$ powder.

It is preferred that both of Al$_2$O$_3$ powder and ZrO$_2$ powder used as the starting materials have a BET specific surface area of at least 5 m$^2$/g.

In the case where Al$_2$O$_3$ is mixed with ZrO$_2$ after the activation treatment by dry pulverization, the mixing can be accomplished, for example, by wet mixing using ball mills.

The so-activated powder mixture is molded according to known molding means such as press molding, cold molding (CIP), extrusion molding, injection molding and slurry casting, and the molded body is transferred to the firing step.

Since the sintering property of the powder per se is improved by the above-mentioned activation treatment, the firing treatment is carried out at a low temperature lower than 1500° C., especially at a temperature of 1300° to 1450° C. The firing treatment is accomplished if the molded body is maintained at the above temperature in the air atmosphere for 1 to 6 hours. Known means can be adopted for the firing treatment. For example, there can be adopted atmospheric pressure firing in air or in an inert gas, hot pressing and hot isostatic firing. In order to obtain a sintered body having a high density, it is preferred that the molded body be first fired at 1350° to 1450° C. under atmospheric pressure and be then subjected to the hot isotactic firing at 1300° to 1500° C. under the atmospheric pressure of 500–2000.

In accordance with one preferred embodiment of the process of the present invention, after the firing treatment, the sintered body is cooled at a rate of 3° to 100° C./min. It is preferred that this cooling rate be adopted until the temperature is lowered to 800° C.

This cooling rate is important for confining the mutual stress in the polycrystalline structure. If this cooling rate is lower than 3° C./min, the mutual stress is weakened, and if the cooling rate is higher than 100° C./min, the sintered body is readily cracked.

In the so-obtained $Al_2O_3$ sintered body of the present invention, $ZrO_2$ is mainly occupied by tetragonal $ZrO_2$ and/or cubic $ZrO_2$ (c-$ZrO_2$) orthorhombic $ZrO_2$ (o-$ZrO_2$), and it is preferred that the proportion of monoclinic $ZrO_2$ be lower than 50%, especially lower than 30%, based on entire $ZrO_2$. If the proportion of m-$ZrO_2$ exceeds 50%, the breaking toughness is drastically degraded.

As is apparent from the foregoing description, according to an embodiment of the present invention, by using a simple system of $Al_2O_3$ and $ZrO_2$ incorporated therein, activating the starting powder by dry pulverization, molding the activated powder and firing the molded body at a low temperature lower than 1500° C., there can be obtained a sintered body in which metastabilized cubic $ZrO_2$ or orthorhombic $ZrO_2$ is dispersed in $Al_2O_3$, and by dint of this structural feature, excellent flexural strength and toughness can be obtained. Furthermore, according to the preparation process of the present invention, excellent characteristics can be obtained by using the simple system without any complicated control, and therefore, the process of the present invention is excellent in the mass-productivity and is economically advantageous.

In the alumina sintered body according to the preferred embodiment of the present invention, by making a mutual stress present among crystalline grains of the fine polycrystalline structure of the $Al_2O_3$-$ZrO_2$ type, both of the flexural strength and breaking toughness can be improved in the $Al_2O_3$-$ZrO_2$ system, and moreover, the high-temperature characteristics and water resistance can be improved. Accordingly, if the sintered body is utilized as a machining tool, chipping of the tool is prevented and the life of the tool can be prolonged.

Although the sintered body of the present invention is especially valuable as a machining tool, the sintered body can also be used as an abrasion-resistant part, a high-temperature material used at temperatures of up to 1000° C., and an artificial bone.

The present invention will now be described in detail with reference to the following examples that by no means limit the scope of the invention.

EXAMPLE 1

$Al_2O_3$ powder having a BET specific surface area larger than 10 $m^2$/g and a purity higher than 99.99% and $ZrO_2$ powder having a BET specific surface area larger than 10 $m^2$/g and a purity higher than 99.9% were dry-pulverized by an attrition mill to effect activation of the powders. When the obtained powders were examined by the X-ray diffractometry, a strain was observed in crystals of $ZrO_2$ powder.

The powders were mixed at a ratio shown in Table 1, and a binder was added in an amount of 6% based on the mixture and spray granulation was carried out. The granulated powdery mixture was molded in a desired shape and the CIP treatment (cold isostatic press molding) was carried out under 6 t/$cm^2$.

The obtained molded body was calcined at 350° C. to remove the binder, and the molded body was preliminarily fired at 1450° C. in air for 2 hours and the obtained sintered body was subjected to the hot isostatic treatment at 1400° C. under 2000 atmospheres in Ar for 1 hour. Thus, sample Nos. 1 through 7 substantially free of pores were obtained.

For comparison, the starting mixture was prepared in the same manner as described above except that wet-mixing using a ball mill was carried out without performing the dry pulverization. The mixture was molded in the same manner as described above, and the molded body was preliminarily fired at 1500° C. in air for 6 hours and was then subjected to the hot isostatic firing under 2000 atmospheres at 1400° C. for 1 hour in argon. Thus, sample Nos. 8 and 9 shown in Table 1 were obtained.

The obtained samples were subjected to the laser Raman measurement using laser beams of 4880 Å and 200 mW.

The scanning speed was 120 $cm^{-1}$/min and the sampling interval was 1.0 $cm^{-1}$.

The chart obtained with respect to sample No. 5 is shown in FIG. 1, and the chart obtained with respect to sample No. 10 described below is shown in FIG. 2.

With respect to each of the charts of the respective samples, the presence or absence of the peak in the vicinity of 600 $cm^{-1}$ was checked, and the ratio (Hc/Ha) of the height Hc of this peak to the height Ha of the peak of $Al_2O_3$ in the vicinity of 415 $cm^{-1}$, that is, (Hc/Ha)×100 (%), was determined.

With respect to each sample, the fired surface was subjected to the X-ray diffractometry using Cu-Kα rays, and the content of the monoclinic crystal in $ZrO_2$, the angle of the maximum peak of $ZrO_2$, the ratio H63/H28 and the ratio H60/H43 were determined.

The monoclinic content in $ZrO_2$ in the X-ray diffractometry was determined by the formula of (peak height of (101) plane of t-$ZrO_2$)/(peak height of (111) plane of m-$ZrO_2$ plus peak height of (101) plane of t-$ZrO_2$).

According to JIS R-1601, the flexural strength was determined by the three-point bending method with respect to the sample processed into a shape of 3 mm×4 mm×40 mm.

The breaking toughness was determined from pressure marks and crack sizes formed when a load of 20 kg was applied by a diamond indenter for measuring the Vickers hardness, by using the Shinbara formula.

The obtained results are shown in Table 1.

For further comparison, a powdery mixture comprising 80% of $Al_2O_3$ powder and 20% of $ZrO_2$ powder containing 3 mole % of $Y_2O_3$ was wet-pulverized by a ball mill, and the mixture was molded as described above and the firing was carried out at a preliminary firing temperature of 1500° C. and a HIP temperature of 1400° C. Thus, sample Nos. 10 and 11 were obtained.

The X-ray diffraction chart of sample No. 5 in Table 1 is shown in FIG. 3, and the X-ray diffraction chart of sample No. 9 in Table 1 is shown in FIG. 4.

TABLE 1

| Sample No. | $Al_2O_3$ (% by weight) | $ZrO_2$ (% by weight) | Monoclinical Content | Peak at 600 $cm^{-1}$ | Hc/Ha (%) | H63/H28 |
| --- | --- | --- | --- | --- | --- | --- |

TABLE 1-continued

| | | | | | | |
|---|---|---|---|---|---|---|
| 1* | 100 | 0 | none | not observed | 0 | none |
| 2 | 99 | 1 | 3 | observed | 8 | 1.50 |
| 3 | 95 | 5 | 3 | observed | 13 | 1.70 |
| 4 | 90 | 10 | 5 | observed | 28 | 2.00 |
| 5 | 80 | 20 | 5 | observed | 30 | 2.30 |
| 6 | 70 | 30 | 20 | observed | 9 | 1.00 |
| 7* | 60 | 40 | 45 | not observed | 0 | 0.10 |
| 8* | 90 | 10 | 65 | not observed | 0 | 0.10 |
| 9* | 80 | 20 | 65 | not observed | 0 | 0.10 |
| 10* | 80 | 20 | 30 | not observed | 0 | 0.10 |
| 11* | 70 | 30 | 35 | not observed | 0 | 0.10 |

| Sample No. | Angle of Maximum Peak of $ZrO_2$ | $H_{60}/H_{43}$ | Breaking Toughness $K_1C$ ($NM/m^{3/2}$) | Flexural Strength ($Kg/mm^2$) |
|---|---|---|---|---|
| 1* | none | none | 4.0 | 65 |
| 2 | 30.35 | 0.25 | 4.2 | 90 |
| 3 | 30.37 | 0.30 | 4.3 | 97 |
| 4 | 30.31 | 0.35 | 4.5 | 110 |
| 5 | 30.30 | 0.40 | 5.0 | 145 |
| 6 | 30.27 | 0.20 | 4.3 | 90 |
| 7* | 30.20 | 0.07 | 4.0 | 65 |
| 8* | 30.20 | 0.07 | 4.2 | 73 |
| 9* | 30.20 | 0.07 | 4.7 | 68 |
| 10* | 30.20 | 0.07 | 4.0 | 68 |
| 11* | 29.8 | 0.07 | 4.5 | 70 |

Note
*outside the scope of the present invention

From the results shown in Table 1, the following can be seen. In the system not containing $ZrO_2$ (sample No. 1), both of the breaking toughness and the flexural strength were low. Of the samples where the high-energy pulverization was carried out, sample No. 7 where the $ZrO_2$ amount exceeded 30% by weight had high monoclinic content and a low breaking toughness though $ZrO_2$ was present in the tetragonal form (t-$ZrO_2$) and the maximum peak angle was 30.2°.

In the case where the dry pulverization was not carried out (samples Nos. 8 and 9), $ZrO_2$ was in the tetragonal form and the monoclinic content was high, and the flexural strength was low.

In sample Nos. 10 and 11 obtained according to the conventional method, the proportion of tetragonal $ZrO_2$ was large and the proportion of monoclinic $ZrO_2$ was small, but the effect was insufficient as compared with the effect attained by the samples of the present invention.

In sample No. 9, the breaking toughness was improved, but the flexural strength was hardly improved.

In contrast to these comparative samples, sample Nos. 2 through 6 of the present invention had a breaking toughness of at least 4.2 $MN/m^{3/2}$ and a flexural strength of at least 90 $Kg/mm^2$. Especially, in the case where Hc/Ha was higher than 10%, that is, H63/H28 was higher than 1.7 and H60/H43 was higher than 0.3, a breaking toughness of at least 4.3 $MN/m^{3/2}$ and a flexural strength of at least 95 kg/mm² were attained.

EXAMPLE 2

$Al_2O_3$ powder having a BET specific surface area of at least 8 m²/g was dry-pulverized for 30 minutes by an attrition mill and was mixed at a ratio shown in Table 2 with $ZrO_2$ powder having a BET specific surface area of at least 6 m²/g, and wet-mixing was carried out by a ball mill using $Al_2O_3$ balls. Then, a binder was added in an amount of 7% based on the powdery mixture, and the mixture was molded into a predetermined shape under a pressure of 2 t/cm² and the binder-removing treatment was carried out. The molded body was preliminarily fired for 6 hours at a temperature shown in Table 2 and then, the hot isotactic firing was carried out under 1990 kg/cm² in an Ar atmosphere for 1 hour at a temperature shown in Table 2. Then, the sintered body was cooled at a cooling rate of 1° to 150° C./min to 800° C. Each of the so-obtained samples had a high density exceeding 99%.

The obtained sample was polished to a size of 3 mm × 4 mm × 45 mm to obtain a test piece for the bending test and the toughness test. Separately, a tablet having a diameter of 15 mm and a thickness of 5 mm was prepared and used as a test piece for the observation of the texture.

The test piece for the observation of the texture was ground and polished by a diamond paste having a diamond particle size of 1 μm, and the test piece was heat-treated at 1450° C. for 5 minutes (the temperature was elevated to 1450° C. over a period of 2 hours). The presence or absence of deformation was checked by SEM observation.

Other properties were determined according to the methods described in Example 1.

The obtained results are shown in Table 2.

TABLE 2

| | | | Firing Conditions | | | |
|---|---|---|---|---|---|---|
| Sample | $Al_2O_3$ (%) | $ZrO_2$ (%) | Preliminary firing temp- | HIP temp- | Cooling rate | Particle size (μm) |

TABLE 2-continued

| No. | by weight) | by weight) | erature (°C.) | erature (°C.) | (°C./min) | $Al_2O_3$ | $ZrO_2$ |
|---|---|---|---|---|---|---|---|
| 1* | 100 | 0 | 1450 | 1450 | 20 | 1.3 | — |
| 2 | 99 | 1 | 1450 | 1450 | 20 | 1.2 | 0.3 |
| 3 | 90 | 10 | 1450 | 1450 | 20 | 0.8 | 0.3 |
| 4 | 80 | 20 | 1450 | 1450 | 20 | 0.7 | 0.3 |
| 5 | 70 | 30 | 1450 | 1450 | 20 | 0.7 | 0.3 |
| 6* | 60 | 40 | 1450 | 1450 | 20 | 0.7 | 0.3 |
| 7* | 90 | 10 | 1550 | 1550 | 20 | 1.5 | 0.5 |
| 8* | 80 | 20 | 1550 | 1550 | 20 | 1.3 | 0.5 |
| 9 | 80 | 20 | 1400 | 1400 | 20 | 0.6 | 0.3 |
| 10 | 80 | 20 | 1350 | 1350 | 20 | 0.5 | 0.2 |
| 11* | 80 | 20 | 1250 | 1250 | 20 | 0.5 | 0.2 |
| 12 | 80 | 20 | 1500 | 1500 | 20 | 1.1 | 0.4 |
| 13* | 80 | 20 | 1450 | 1450 | 1 | 1.3 | 0.5 |
| 14* | 80 | 20 | 1450 | 1450 | 150 | 1.0 | 0.3 |
| 15* | 80 | 20 | 1500 | 1400 | 20 | 1.0 | 0.5 |

| Sample No. | Monoclinic Content | Peak at $600\ cm^{-1}$ | Hc/Ha (%) | $H_{63}/H_{28}$ | Angle of Maximum Peak of $ZrO_2$ | $H_{60}/H_{43}$ |
|---|---|---|---|---|---|---|
| 1* | 0 | not observed | 0 | none | none | none |
| 2 | 4 | observed | 8 | 1.50 | 30.35 | 0.25 |
| 3 | 6 | observed | 25 | 1.80 | 30.31 | 0.30 |
| 4 | 6 | observed | 27 | 2.20 | 30.30 | 0.38 |
| 5 | 23 | observed | 7 | 0.85 | 30.27 | 0.15 |
| 6* | 50 | not observed | 0 | 0.10 | 30.20 | 0.07 |
| 7* | 80 | not observed | 0 | 0.10 | 30.20 | 0.07 |
| 8* | 80 | not observed | 0 | 0.10 | 30.20 | 0.07 |
| 9 | 4 | observed | 32 | 2.35 | 30.30 | 0.41 |
| 10 | 2 | observed | 34 | 2.38 | 30.30 | 0.42 |
| 11* | 98 | not observed | 0 | 0.10 | 30.20 | 0.07 |
| 12 | 10 | observed | 18 | 1.85 | 30.27 | 0.25 |
| 13* | 12 | observed | 19 | 1.90 | 30.20 | 0.07 |
| 14* | | measurement impossible because of breaking | | | | |
| 15* | 100 | not observed | 0 | 0.10 | 30.20 | 0.07 |

| Sample No. | Deformation of Texture by Heat Treatment | Flexural Strength (Kg/mm²) | Breaking Toughness (MN/m³/²) |
|---|---|---|---|
| 1* | none | 63 | 4.3 |
| 2 | small | 90 | 4.6 |
| 3 | large | 110 | 4.7 |
| 4 | large | 125 | 4.9 |
| 5 | small | 88 | 4.7 |
| 6* | none | 60 | 4.3 |
| 7* | none | 68 | 4.2 |
| 8* | none | 66 | 4.2 |
| 9 | large | 137 | 4.8 |
| 10 | large | 135 | 4.6 |
| 11* | none | 30 | measurement impossible because of many voids |
| 12 | small | 90 | 5.0 |
| 13* | none | 50 | 4.5 |
| 14* | breaking by cooling | — | |
| 15* | none | 68 | 4.0 |

Note
*outside the scope of the present invention

From the results shown in Table 2, the following can be seen. In sample No. 1 in which $ZrO_2$ was not incorporated, both of the flexural strength and the breaking toughness were low. In sample No. 6 where the amount of $ZrO_2$ exceeded 30% by weight, it was necessary to set the firing temperature at a level exceeding 1500° C., and the characteristics of the obtained sintered body were insufficient and no mutual stress was observed among particles. In sample Nos. 7 and 8 where the firing temperature was higher than 1500° C. though the amount of $ZrO_2$ was 1 to 30% by weight, the characteristics were poor and no mutual stress was observed. In sample No. 11 where the firing temperature was lower than 1300° C., the strength was extremely low and the sintered body could not be practically used.

In the case where the cooling rate was outside the range of 3° to 100° C./min after the firing step (sample Nos. 13 and 14), no mutual stress was observed, and in sample No. 14 where the cooling speed was too high, breaking was caused.

In sample No. 15 where $Al_2O_3$ powder was not dry-pulverized but merely wet-mixed with $ZrO_2$ powder, both of the flexural strength and the toughness were low and the characteristics were insufficient, and no mutual stress was observed.

In contrast, each of sample Nos. 2 through 5, 9, 10 and 12 according to the present invention had high flexural strength and high breaking toughness, and the mutual stress was large. More specifically, the larger was the deformation by the heat treatment, the more improved were the characteristics, and each sample had a flexural strength of at least 85 kg/mm² and a breaking toughness of at least 4.5 MN/m^{3/2}.

When the high-temperature flexural strength of sample No. 4 in Table 2 was measured at 1000° C., it was found that the high-temperature flexural strength was as high as 65 kg/mm². Thus, it was confirmed that the sample had high-temperature characteristics comparable to those of a silicon carbide sintered body.

When sample No. 4 was thrown into water maintained at 120° C. and allowed to stand still in this state for 100 hours, the strength was hardly influenced though the strength drastically reduced in case of partially stabilized $ZrO_2$. Accordingly, it was confirmed that the sample was also excellent in the water resistance.

I claim:

1. A high-strength alumina sintered body consisting of:

1 to 30% by weight, based on $Al_2O_3$ and $ZrO_2$, of $ZrO_2$;

99 to 70% by weight, based on $Al_2O_3$ and $ZrO_2$, of $Al_2O_3$; and unavoidable impurities;

said sintered body having a peak based on $ZrO_2$ at a position of a wave number of $600\pm10$ cm$^{-1}$ in a measurement chart of the laser Raman spectrum analysis.

2. A sintered body as set forth in claim 1, wherein the peak heigh ratio defined by the formula of (Hc/Ha)×100, in which Hc stands for the height of the peak based on $ZrO_2$ at a position of a wave number of $600+10$ cm$^{-1}$ and Ha stands for the height of the peak based on $Al_2O_3$ at a wave number of 415 cm$^{-1}$ or in the vicinity thereof, is at least 10.0.

3. A sintered body as set forth in claim 2, wherein the peak height ratio is at least 20.0.

4. A sintered body as set forth in claim 1, which satisfies the requirements of H63/H28>0.1 and H60/H43>0.07, in which H60 stands for the peak height at $2\theta=59.5°$ to 61° in the X-ray diffractometry using Cu-K rays, H63 stands the peak height at $2\theta=62.0°$ to 63.5°, H43 stands for the height of the main peak of $\alpha$-$Al_2O_3$ at $2\theta=43°$ or in the vicinity thereof, and H28 stands for the peak height of monoclinic $ZrO_2$ at $2\theta=28°$ or in the vicinity thereof.

5. A sintered body as set forth in claim 4, wherein the value of H63/H28 is in the range of from 1.00 to 2.30 and the value of H60/H43 is in the range of from 0.20 to 0.40.

6. A sintered body as set forth in claim 1, which has a breaking toughness of at least 4.2 MN/m^{3/2} and a flexural strength of 90 kg/mm².

7. A sintered body as set forth in claim 1, wherein the sintered body has a polycrystalline structure in which zirconia is present in the form of particles having an average size smaller than 0.5 μm and alumina is present in the form of particles having an average particle size smaller than 1.3 μm, and an intergranular mutual stress is present in the polycrystalline structure.

8. A sintered body as set forth in claim 7, wherein the intensity of the intergranular mutual stress is such that when the sintered body is heat-treated at 1200° to 1600° C., deformation is caused in at least some of the alumina particles.

* * * * *